United States Patent [19]
Dismukes et al.

[11] 3,894,164
[45] July 8, 1975

[54] CHEMICAL VAPOR DEPOSITION OF LUMINESCENT FILMS

[75] Inventors: John Pickett Dismukes, Princeton, N.J.; James Kane, Affoltern am Albis, Switzerland

[73] Assignee: RCA Corporation, New York, N.Y.

[22] Filed: Mar. 15, 1973

[21] Appl. No.: 341,597

[52] U.S. Cl. ............... 427/70; 427/64; 427/157; 427/248; 252/301.2 R; 252/301.4 F; 252/301.45; 260/429.2
[51] Int. Cl.² ............ B44D 1/02; C23C 11/02
[58] Field of Search .... 117/33.5 C, 106 R, 107.2 R; 252/301.2 R, 301.2 S, 301.4 F; 260/429.2

[56] References Cited
UNITED STATES PATENTS

| | | | |
|---|---|---|---|
| 3,018,194 | 1/1962 | Norman et al. | 117/107 |
| 3,178,308 | 4/1965 | Oxley et al. | 117/106 |
| 3,297,414 | 1/1967 | Mazdiyasni et al. | 23/345 |
| 3,356,527 | 12/1967 | Moshier et al. | 117/107.2 R |
| 3,372,297 | 3/1968 | Pearsall et al. | 313/317 |
| 3,594,216 | 7/1971 | Charles et al. | 117/107.2 R |
| 3,634,477 | 1/1972 | Chattoraj et al. | 117/107.2 R |

*Primary Examiner*—William R. Trenor
*Attorney, Agent, or Firm*—G. H. Bruestle; L. Greenspan

[57] ABSTRACT

Method for depositing a luminescent film comprising vaporizing into a nonreactive carrier gas at least one betadiketonate of yttrium, lanthanum, gadolinium, and lutetium, and at least one beta-diketonate of a lanthanide that is an activator for the luminescent film; and then contacting the vapor-laden carrier gas with a heated substrate. The beta-diketonates are thermally decomposed to form oxides which deposit on the substrate. The method is continued until the desired film thickness is deposited. There may be one or more reactant gases present for preventing the deposition of carbon and/or for producing a luminescent sulfide. The carrier gas may contain a vanadium-containing beta-diketonate for producing a luminescent vanadate. The luminescent film may be annealed at temperatures above 500°C to enhance the luminescence of the film.

8 Claims, 2 Drawing Figures

CHEMICAL VAPOR DEPOSITION OF LUMINESCENT FILMS

BACKGROUND OF THE INVENTION

This invention relates to a chemical vapor deposition method for producing luminescent films by thermal decomposition of organometallic compounds.

Luminescent films are employed in viewing screens of various electronic devices, such as television picture tubes, oscillographs, cathode-ray display tubes, and image tubes. such luminescent films have been made by evaporation and condensation of the luminescent material, or by thermal decomposition of inorganic compounds containing the constituents of the luminescent material at or in the vicinity of the substrate for the film.

SUMMARY OF THE INVENTION

In the novel method, a luminescent film is produced by the thermal decomposition of metal-containing beta-diketonates in the vicinity of the substrate for the film. Specifically, the novel method comprises vaporizing into a nonreactive carrier gas at least one M(thd)$_3$ compound and at least one Ln(thd)$_3$ compound; wherein M is at least one of yttrium, lanthanum, gadolinium, and lutetium; Ln is at least one lanthanide which is an activator for the film; and (thd) is a tetramethylheptanedionate radical. The vapor-laden carrier gas is then contacted with the surface of a substrate that is heated at about 400° to 750°C. the beta-diketonates are thermally decomposed to form metal oxides which deposit on the substrate. The method is continued until the desired luminescent film thickness is deposited. The substrate may be an extended surface or may be the surface of a particle.

One or more reactant gases, such as oxygen and/or water vapor, may be present for preventing the deposition of carbon during the thermal decomposition of the beta-diketonates. One or more reactant gases, such as sulfur vapor, hydrogen sulfide, and/or carbon disulfide, may be present during the thermal decomposition for the purpose of producing a luminescent oxysulfide film instead of a luminescent oxide film. The carrier gas may contain a vanadium-containing beta-diketonate for the purpose of producing a luminescent vanadate film. The luminescent film may be annealed at temperatures above about 500°C to enhance the luminescent properties of the film.

DETAILED DESCRIPTION OF THE INVENTION

The metal beta-diketonates that are useful in the novel method are M(thd)$_3$ compounds, where the metal M is at least one of yttrium, lanthanum, gadolinium, and lutetium; and (thd) is a tetramethylheptanedionate radical. The preferred metal beta-diketonates are 2,2,6,6-tetramethyl-3,5-heptanedionates represented by the formula

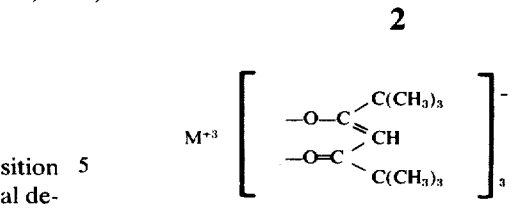

or M[C(CH$_3$)$_3$COCHCOC(CH$_3$)$_3$]$_3$.

Lanthanide beta-diketonates that are useful in the novel method are Ln(thd)$_3$ compounds, where Ln is at least one rare earth element that is an activator for the luminescent film and (thd) is a tetramethylheptanedionate radical. The preferred lanthanide beta-diketonates are 2,2,6,6-tetramethylheptane-3,5-dionates represented by the formula

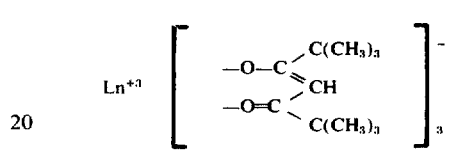

or Ln[C(CH$_3$)$_3$COCHCOC(CH$_3$)$_3$]. Lanthanides or rare earth elements that are known to be activators for yttrium oxide, yttrium oxysulfide and yttrium vanadate, and which are useful as activators in the novel method, are dysprosium, erbium, holmium, neodymium, praseodymium, samarium, terbium, and thulium. Such activators may be used singly or in combination with other activators in the novel method as beta-diketonates.

The above-mentioned metal and lanthanide beta-diketonates can be prepared by reaction of hydrated metal M or lanthanide Ln chlorides or nitrates with 2,2-,6,6-tetramethylheptane-3,5-dione, for example, according to the method described by Eisentraut et al. in *J. Amer. Chem. Soc.* 87 5254 (1965). The beta-diketonates produced have a vapor pressure of about 1 torr in the temperature range of about 150° to 200°C, and are stable in the vapor phase up to about 250°C.

A vanadium-containing beta-diketonate is used for preparing vanadate luminescent films. such vanadium-containing beta-diketonates can be a vanadyl tetramethyl heptanedionate VO(thd)$_2$, which may be prepared by the same general method cited above, or may be another beta-diketonate, such as vanadyl acetylacetonate VO(AcAc)$_2$ which is also written as VO[CH$_3$COCHCOCH$_3$]$_2$.

Figure 1:
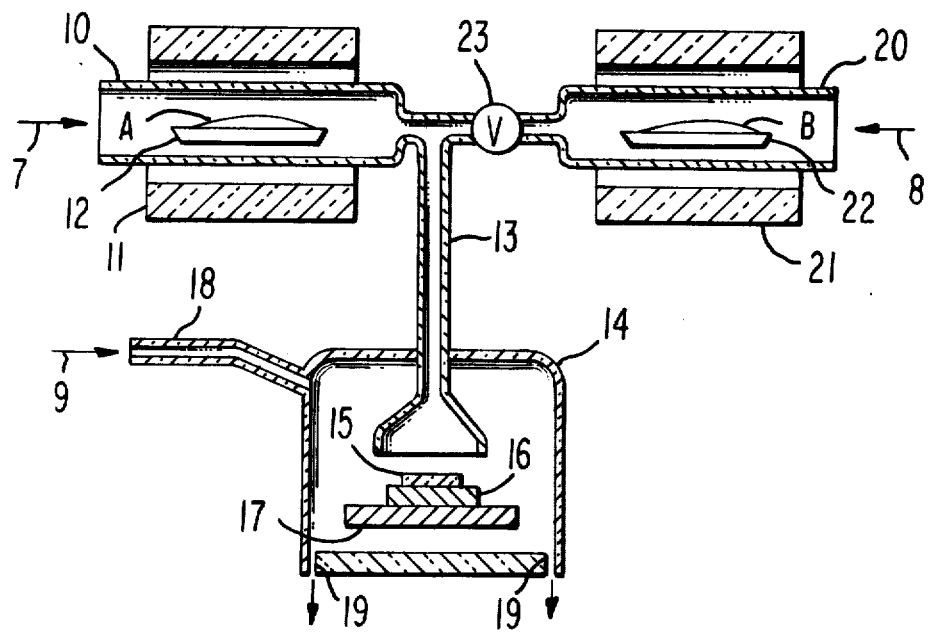
FIG. 1 is a sectional elevational view of an apparatus in which the novel method may be practiced for producing luminescent films on extended surfaces.

An apparatus suitable for preparing a luminescent film on an extended surface of a substrate by the novel method is shown in FIG. 1. A similar apparatus is described in *RCA Review* 29 525 (1968). In the apparatus shown in FIG. 1, a first stream 7 of nonreactive carrier gas is introduced into a first inlet tube 10, which is encased in a first furnace 11 and wherein is situated a first container 12 containing a material A comprising a mixture of beta-diketonates of host and activator cations for the desired luminescent film. should it be desirable to produce an oxide or sulfide luminescent film, then the stopcock 23 is closed. However, should it be desirable to produce a vanadate luminescent film, then the stopcock 23 is opened and a second stream 8 of nonreactive carrier gas is introduced into a second inlet tube 20, which is encased in a second furnace 21 and wherein is situated a second container 22 containing a material B comprising a vanadium-containing beta-diketonate. The first carrier gas stream passes through the first inlet tube 10 over the material A, which is held by the first furnace 11 at temperatures between about 180° and 250°C, depending on the vapor pressure of the beta-diketonates used. The beta-diketonates of mixture A volatilize into the first carrier gas stream and pass by way of the outlet tube 13 to a reaction chamber 14 containing the substrate 15 to be coated. Where a vanadate luminescent film is to be produced, the second carrier gas passes over the material B in the second inlet tube 20, which is held by the second furnace 21 at temperatures between about 180° and 250°C, depending on the vapor pressure of the beta-diketonate used. The vanadium-containing beta-diketonate volatilizes into the second gas stream, mixes with the first carrier gas stream, and passes by way of the outlet tube 13 to the reaction chamber 14. The substrate 15 to be coated, which may be a faceplate for a cathode-ray tube, rests on a heating plug 16, which is thermally connected to a heating platform 17 that heats the substrate 15 through the plug 16 to the desired temperature. A third stream 9 of nonreactant gas containing one or more reactant gases can be passed into the reaction chamber 14 by way of a third inlet tube 18 to provide a reactant gas in the atmosphere of the reaction chamber 14. The spent gases in the reaction chamber 14 exit therefrom through vents 19 in the base of the reaction chamber.

Any nonreactive substrate which has a suitably high melting point can be employed in the novel method. The melting point of the substrate should be at least above 400°C, which is the low end of the temperature range for depositing the luminescent film, and preferably as high as possible. Where an annealing step is employed, the melting point of the substrate should be above the desired annealing temperature. Some suitable substrate materials are glass, quartz, sapphire, garnet, alumina, silicon carbide, spinel, and mica. The novel method is readily adaptable for depositing luminescent films on the inner walls or surfaces of a hollow tube or container.

The carrier gas can be any nonreactive gas, such as neon, argon, krypton, nitrogen, or combinations thereof. Oxygen gas and/or water vapor may be introduced into the carrier gas to provide a desirable ambient for producing the desired films and may prevent the deposition of carbon from the thermal decomposition of the beta-diketonates. Water vapor may be introduced by bubbling a nonreactive gas, with or without oxygen gas present, through water. The reactant gas optionally may be sulfur vapor, hydrogen sulfide, carbon disulfide and/or another sulfur-containing gas introduced for the purpose of producing a luminescent oxysulfide instead of a luminescent oxide. The entire system is preferably operated at pressures between 20 and 760 torr.

The time required for the reaction can vary from about 5 minutes up to an hour or more, depending on the temperature of the substrate and the thickness of the luminescent film desired. In general, the higher the furnace temperature and/or the longer the reaction time, the thicker will be the luminescent film produced.

The substrate 15 is held at a temperature of at least about 400°C in order for the rate of reaction of the constituents to be appreciable. Reaction temperatures up to about 750°C can be employed. A reaction temperature of about 500°C is preferred.

The apparatus of FIG. 1 is typically operated with about 1 gram of material A consisting of M(thd)$_3$ containing 0.1 to 10 mol percent Ln(thd)$_3$ in the first furnace 11. With the third gas stream 9 containing reactant gas flowing, the first stream of gas, typically argon, containing vapors from the material A from the first furnace 11 passes into the reaction chamber 14 and mixes with the third gas stream. This mixture contacts the surface of the substrate 15, where the vapors of material A are thermally decomposed and a film deposits on the surface of the substrate 15, typically a quartz or pyrex plate. The substrate 15 is held at temperatures in the range of about 400 to 750°C. When the reactant gas is oxygen or oxygen plus water vapor, luminescent films of $M_2O_3$ are obtained. When the reactant gas is water vapor plus hydrogen sulfide, luminescent films of $M_2O_2S$ are obtained. When the reactant gas is oxygen or oxygen plus water vapor and a volatile vanadyl beta-diketonate is introduced, luminescent films of $YVO_4$ are obtained.

The luminescent films produced are very uniform in thickness, and the volatilization of about 0.5 gram of metal beta-diketonate in 2 hours gives a weight gain of about 5 milligrams on each of three quartz plates, each being one square inch in area. This corresponds to a thickness of about 1.5 microns, assuming a theoretical 100% density for the film. The chemical yield on the quartz plates alone is about 20% of the starting material.

In addition to single layers, multiple layers of luminescent films may be produced. For example, by successive depositions, a luminescent film of $Y_2O_3$ may be grown upon a luminescent film of $Y_2O_2S$.

An improved luminescent brightness may be obtained by annealing the luminescent film for periods as short as one minute up to about one hour at temperatures above about 500°C and below the softening temperature of the substrate in oxygen gas, water vapor, or oxygen plus water vapor for luminescent $MVO_4$ and $M_2O_3$ films, or in water vapor plus hydrogen sulfide for luminescent films of $M_2O_2S$.

Figure 2:
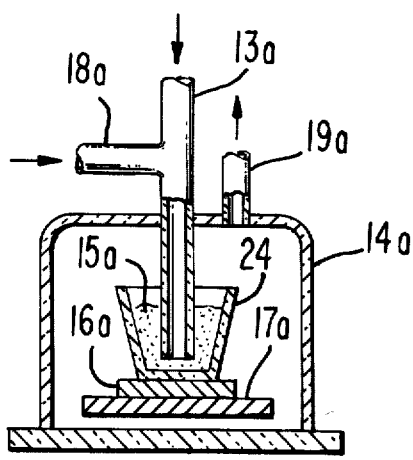
FIG. 2 is a sectional elevational view of a portion of an apparatus in which the novel method may be practiced for depositing luminescent films on particles.

An apparatus suitable for preparing luminescent films on the surfaces of particles according to the novel method is shown in FIG. 2. This apparatus employs first and second inlet tubes in first and second furnaces respectively in which there are situated first and second containers, and common outlet tube 13a from the inlet tubes, substantially as shown in the apparatus of FIG. 1. The outlet tube 13a extends into a reaction chamber 14a and then into a mass 15a of particles to be coated. The mass 15a of particles is loosely held in a third container 24 which rests on a heating plug 16a. The heating plug 16a is thermally connected to a hot plate 17a, which heats the particles 15a through the plug 16a and the container 24 to the desired temperature. A reactant gas can be introduced through a third inlet tube 18a, which is connected to the outlet tube 13a. The reactant gas mixes with the vapor-laden carrier gas in the outlet tube 13a, and the mixture carrying the metal beta-diketonates and the reactant gases passes downward into the mass 15a of particles and then upward through the particles, which constitutes a fluidized bed. The spent gases exhaust from the reaction chamber 14a through a vent 19a in the wall of the reaction chamber.

EXAMPLE 1

Using the apparatus shown in FIG. 1, with the stopcock 23 closed, place in the first container 12 about one gram of a mixture containing 95 mole percent yttrium 2,2,6,6-tetramethyl-3,5-heptanedionate and 5 mole percent europium 2,2,6,6-tetramethyl-3,5-heptanedionate. With the first furnace 11 heated to about 220°C and a substrate of quartz heated to about 480°C, pass a first stream of argon carrier gas at the rate of about 400 cc/min. through the first inlet tube 10 to the reaction chamber 14. At the same time, pass into the third inlet tube 18 a stream of a reactant gas mixture comprised of 500 cc/min. argon and 2,000 cc/min. oxygen gas. Continue the procedure for about 60 minutes. Then, cut off the first stream of carrier gas, continue the stream of reactant gas mixture, and raise the substrate temperature to about 800°C and continue to heat for about 60 minutes. This latter step constitutes the annealing of the deposited film. Then, lower the substrate temperature to room temperature with the stream of reactant gas mixture flowing. The product is a luminescent film consisting essentially of europium-activated yttrium oxide $(Y,Eu)_2O_3$ about 1.5 microns thick on the surface of the quartz substrate. The properties are shown in the TABLE below.

EXAMPLE 2

Follow the procedure of Example 1 except, in addition, place about one gram of vanadyl acetylacetonate in the second container 22, open the stopcock 23, heat the second container 22 to about 220°C, and pass a second stream of argon carrier gas at the rate of 220 cc/min. through the second inlet tube 20. The product is a luminescent film of europium-activated yttrium vanadate $(Y,Eu)VO_4$ about 1.5 microns thick on the surface of the quartz substrate. The properties of the film are shown in the TABLE below.

EXAMPLE 3

Follow the procedure of Example 1 except change the reactant gas mixture to a mixture of 500 cc/min. argon and 200 cc/min. hydrogen sulfide. The product is a luminescent film of europium-activated yttrium oxysulfide $(Y,Eu)_2O_2S$ on the quartz substrate.

Other examples of films produced by the novel method are shown in the TABLE below. These films were obtained by substituting lanthanum, gadolinium, or lutetium for yttrium and/or substituting terbium or praseodymium for europium in Example 1, 2 or 3, depending upon the desired composition of the film.

The luminescent film prepared by the novel method may be excited by cathode rays, ultraviolet light, or x-rays. The films may be used in devices which employ a target or screen which is excited by one or more of these modes or excitation.

The TABLE below lists the visual emission color and relative brightness of the indicated films prepared by the novel method and excited with 10 kilovolt electron beams. The brightness is compared with the brightness of a powder sample of europium-activated yttrium oxide.

TABLE

| Host | Activator | Mole % Activator | Emission Color | Relative Brightness |
|---|---|---|---|---|
| $Y_2O_3$ | Eu | 5 | red | 50 |
| $Y_2O_3$ | Tb | 5 | green | 20 |
| $Y_2O_2S$ | Eu | 5 | red | 20 |
| $Y_2O_2S$ | Tb | 5 | green | 20 |
| $Y_2O_2S$ | Pr | 0.05 | green | 25 |
| $YVO_4$ | Eu | 5 | red | 50 |
| $La_2OS$ | Tb | 0.3 | green | 20 |
| $La_2O_2S$ | Pr | 0.3 | green | 40 |
| $Gd_2O_3$ | Eu | 5 | red | 20 |

We claim:
1. A method for depositing a luminescent film comprising
   a. vaporizing into a nonreactive carrier gas at least one $M(thd)_3$ beta-diketonate and at least one $Ln(thd)_4$ beta-diketonate, wherein M is at least one member of the group consisting of yttrium, lanthanum, gadolinium, and lutetium, Ln is at least one lanthanide selected from the group consisting of dysprosium, erbium, holmium, neodymium, praseodymium, samarium, terbium and thulium, and (thd) is a tetramethylheptanedionate radical,
   b. mixing with said vapor-laden carrier gas a reactant gas selected from the group consisting of vanadium-containing betadiketonates, hydrogen sulfide, sulfur vapor, and carbon sulfide,
   c. contacting the vapor-laden carrier gas mixture with a substrate that is heated to temperatures in the range of 400° to 750°C until the substrate is coated with said luminescent film,
   d. and then lowering the temperature of said substrate to room temperature.

2. The method defined in claim 1 wherein the method is carried out at pressures in the range of 20 to 760 torr.

3. The method defined in claim 1 wherein said reactant gas is a vanadium-containing beta-diketonate.

4. The method defined in claim 1 wherein said reactant gas is carbon disulfide.

5. The method defined in claim 1 wherein said reactant gas is hydrogen sulfide.

6. The method defined in claim 1 wherein said reactant gas is sulfur vapor.

7. The method defined in claim 1 including the step of annealing said luminescent film above 500°C and below the softening temperature of said substrate for a time interval sufficient to enhance the luminescence from said film.

8. The method defined in claim 7 wherein said substrate is annealed in an atmosphere consisting essentially of a nonreactive gas and at least one of oxygen, water vapor, hydrogen sulfide, sulfur vapor, and carbon disulfide.

* * * * *